G. H. LEE.
HEATING SYSTEM FOR INCUBATORS.
APPLICATION FILED AUG. 25, 1911.
1,040,701.
Patented Oct. 8, 1912.
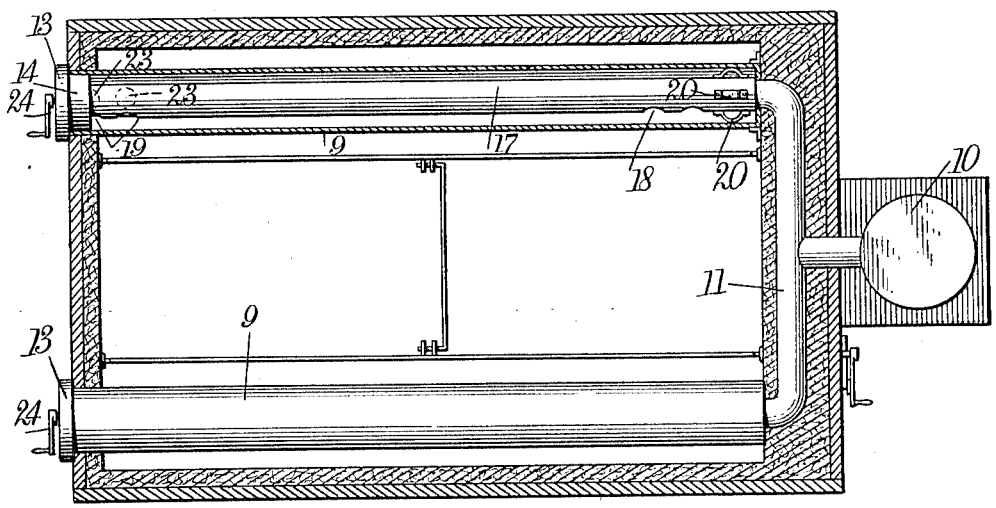
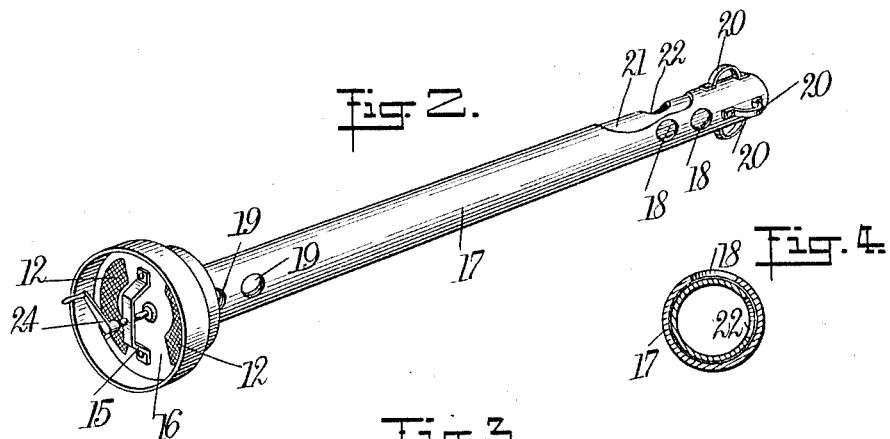
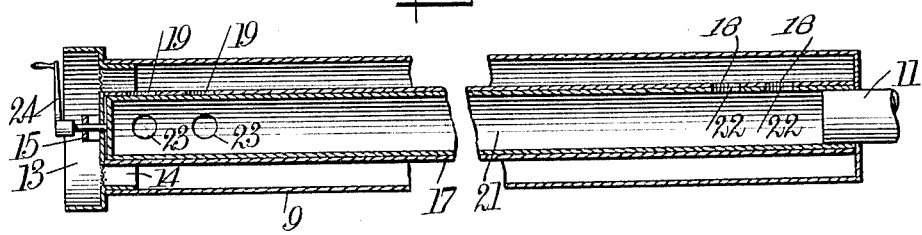
WITNESSES
INVENTOR
George H. Lee
BY Munn Co
ATTORNEYS

UNITED STATES PATENT OFFICE.

GEORGE HOWARD LEE, OF OMAHA, NEBRASKA.

HEATING SYSTEM FOR INCUBATORS.

1,040,701.   Specification of Letters Patent.   Patented Oct. 8, 1912.

Application filed August 25, 1911. Serial No. 645,935.

*To all whom it may concern:*

Be it known that I, GEORGE H. LEE, a citizen of the United States, and a resident of Omaha, in the county of Douglas and State of Nebraska, have invented a new and Improved Heating System for Incubators, of which the following is a full, clear, and exact description.

Among the principal objects which the present invention has in view are: to provide means whereby the temperature in an incubating chamber may be distributed to equalize or vary the temperature of various parts of said chamber at will; to provide means for arresting the smoke or fumes emanating from the ordinary heater lamp; and to provide registers for regulating the distribution of the heat, said registers constructed in a simple, efficient and durable manner.

One embodiment of the present invention is disclosed in the structure illustrated in the accompanying drawings, in which like characters of reference denote corresponding parts in all the views, and in which—

Figure 1 is a horizontal section of an incubator provided with a heating system constructed and arranged in accordance with the present invention, the section being taken through the upper part of the incubating chamber; Fig. 2 is a detail view in perspective of a heat distributing register constructed and arranged in accordance with the present invention, a portion of the outer pipe being cut away to show registering openings in the inner pipe; Fig. 3 is a longitudinal section of the register shown in Fig. 2, the section being taken on the median line thereof; and Fig. 4 is a cross section of the register shown in Fig. 2, the section being taken through the registering perforations provided in the inner and outer distributing pipes.

As shown in the accompanying drawings, the incubator is provided with heat drums 9, 9. The drums 9 are extended lengthwise the incubating chamber of the incubator, and preferably disposed adjacent the upper corners thereof. The heater 10 preferably employed in conjunction with the present invention delivers its product to the distributing pipe 11, the ends of which pipe are inturned and supported within the one end of each of the drums 9. The ends of the drums 9 opposite those wherein are inserted the ends of the pipe 11 are partially closed by filtering screens 12, 12. The screens 12, 12 are constructed from wire gauze the mesh whereof is sufficiently small to arrest soot or floating partially combusted particles. The screens 12 are supported in thimbles 13. The thimbles 13 are provided with flanges 14, which flanges are insertible within the open ends of the drums 9. Between the sides of the thimble 13 is extended the bridge 16 whereon is secured the handle 15, as seen best in Fig. 2 of the drawings. Rigidly secured to the bridge 16 is the register pipe 17. The pipe 17 is opened at the free end, and is adapted to extend over the ends of the pipe 11 where the same is inserted within the drum 9, as best seen in Fig. 3.

In the operation as a register the pipe 17 receives the heat from the pipe 11 and heater 10 and delivers the same into the drum 9 at the opposite ends thereof successively; that is to say, when delivering the heat at the one end of the drum 9 the pipe 17 is closed against the delivery of the heat to the drum at the other end thereof. For this purpose the pipe 17 is provided with perforations 18 and 19, the former being adjacent the end supported by the pipe 11 and the latter being provided in the end of the pipe 17 opposite the end supported by the pipe 11.

For the purpose of simplification of construction the thimble 13, flange 14, bridge 16 and pipe 17 are formed as an integral structure, the handle 15 being provided for the insertion and withdrawal of the said pipes within the said drums. To guide the inner ends of the said pipes 17 they are provided with a series of spring loops 20, which loops bear against the sides of the drums 9 and hold the ends of the pipes 17 concentric with the pipes 11 so that when the said pipes 17 are forced into the drums 9 the ends of the pipes 17 fit over the ends of the pipes 11.

Rotatively mounted within the pipe 17, and infolded thereby, is a pipe 21. The pipe 21 has a series of perforations 22 and 23, which perforations are adapted for registration with the perforations 18 and 19 respectively. The perforations 22 and 23 are disposed in the pipe 21 at different parts of the circumference thereof. Preferably, as shown in Fig. 2 of the drawings, the perforations 18 and 19 are alined with reference to the circumference of the pipe 17. The perforations 22 and 23 in the pipe 21 are, as shown in Fig. 3 of the drawings, disposed at positions in the circumference of the pipe 21 90 degrees apart. In this manner when the pipe 21 is disposed so that the perforations 22 register with the perforations 18, the perforations 23 do not register with the perforations 19, which are consequently closed for the delivery of heat from the pipes 21 and 17. The pipe 21 is rotated by means of a crank handle 24, which handle is rigidly connected with the said pipe.

The operation of the heating system as above described and as shown in the accompanying drawings is as follows:—If the thermometers with which the incubator is provided indicate that heat is needed in that section of the incubating chamber adjacent the forward end of the drums 9, the handles 24 and the pipes 21 connected therewith are turned so that the perforations 23, 23 register with the perforations 19, 19. This movement of the handles 24 closes the perforations 18, 18 at the rear end of the incubating chamber. This induces the delivery of the heat from the pipe 11 to the drum 9 at the forward end thereof, limiting to a large extent the delivery to and consequent heating of the drums 9 at the rear end, thus supplying the need for extra heat at the forward end of the incubating chamber.

If the thermometers should indicate a more localized requirement for extra heat, as, for instance, at the left hand front corner of the chamber, the handle 24 on the left hand side of the incubator would be turned to register the perforations 23 and 19, closing the perforations 18 in the pipe 17 on the left hand side of the incubator. If desired, the total heat may be localized at the said left hand forward corner by turning the handle 24 and pipe 21 connected therewith on the right hand of the incubator, so that neither of the perforations 22—23 register with either of the perforations 18—19, thus closing the pipes 17—21 against the delivery of heat to the drum 9 and forcing the delivery of the total heat from the heater 10 into the left hand drum 9, and by reason of the disposition of the registering perforations mentioned localizing the delivery of the total heat at the forward left hand corner of the incubating chamber.

It will be seen that a great number of combinations may be formed whereby the heat may be localized to satisfy the needs as indicated by the thermometers, or the caprice or will of the operator.

When it is desired to clean the pipes 21 and 17, or the drums 9, of soot or other deposit, the pipes are withdrawn from the drums by grasping the handle 15 and withdrawing the said pipes. When cleaned the operation of reinstalling the pipes is as simple as that of withdrawing the same.

Having thus described my invention, what I claim as new and desire to secure by Letters Patent is:—

1. In a system of the character described, the combination with a plurality of heat drums each having a closed end and an open end; of a heater having a delivery flue entering each of said drums; register pipes in open communication with the said delivery flues of said heater and extended lengthwise of said drums, said register pipes having openings adjacent the opposite ends thereof; means rotatively mounted in said register pipes for successively exposing and closing said openings in the opposite ends of said pipes; and a crank handle connected with said means for rotating same within said pipes.

2. In a system of the character described, the combination with a plurality of heat drums each having a closed end and an open end; of a heater having delivery flues extended within said drums; register pipes one in each of said drums in open communication with the delivery flues connected with said heater, said register pipes having openings adjacent opposite ends thereof; and closure pipes rotatively mounted in said register pipes and provided with openings adjacent the ends thereof to register with the openings in the register pipes, said openings in the closure pipes being differently arranged circumferentially from the openings in the register pipes whereby the distribution of the heated air at opposite ends of said pipes is varied.

In testimony whereof I have signed my name to this specification in the presence of two subscribing witnesses.

GEORGE HOWARD LEE.

Witnesses:
A. KEENAN,
V. M. COOPER.

---

Copies of this patent may be obtained for five cents each, by addressing the "Commissioner of Patents, Washington, D. C."